US006286197B1

(12) United States Patent
Polkhovskiy et al.

(10) Patent No.: US 6,286,197 B1
(45) Date of Patent: Sep. 11, 2001

(54) OIL BURNER DRIVE COUPLING REMOVAL TOOL

(76) Inventors: Nikolay Polkhovskiy, 17 Mohawk St., Whitesboro, NY (US) 13492; Alan Greenwood, 3337 Black Creek Rd., Cold Brook, NY (US) 13324

( * ) Notice: Subject to any disclaimer, the term of this patent is extended or adjusted under 35 U.S.C. 154(b) by 0 days.

(21) Appl. No.: 09/570,516

(22) Filed: May 16, 2000

(51) Int. Cl.[7] .................................................... B23P 19/04

(52) U.S. Cl. ............................ 29/426.5; 29/267; 29/280; 29/282

(58) Field of Search ............................ 29/426.5, 890.02, 29/267, 282, 283, 280

(56) References Cited

U.S. PATENT DOCUMENTS

| | | | | |
|---|---|---|---|---|
| 3,619,887 | * | 11/1971 | McLaughlin | 29/804 |
| 4,768,271 | * | 9/1988 | Jacob et al. | 29/267 |
| 4,989,770 | * | 2/1991 | Soto | 225/103 |

* cited by examiner

*Primary Examiner*—S. Thomas Hughes
*Assistant Examiner*—Essama Omgba

(74) *Attorney, Agent, or Firm*—David Giglio

(57) ABSTRACT

The present invention is concerned with an apparatus and method for removing a drive coupling component from an oil burner unit housing. A drive coupling comprises a first drive coupling end fitting disposed on an oil pump shaft, a second drive coupling end fitting disposed on a motor shaft and a drive coupling connector which connects the first and second drive coupling end fittings. The apparatus comprises a handle having a proximal and a distal end, a front wall contiguous with the distal end of said handle and including a proximal exterior surface and a distal interior surface. A receiver for receiving at least one drive coupling component is contiguous with the interior surface of the front wall. An engagement member, which engages a distal end of a second drive coupling end fitting, is contiguous with the distal end of the receiver. The apparatus of the present invention preferably includes at least one pry receptor disposed on the handle for receiving a prying instrument, wherein the at least one pry receptor includes at least one opening disposed through the handle. In use, a technician places the apparatus through an oil pump opening in the oil burner unit so that the receiver lodges underneath the second drive coupling end fitting, inserts a pry instrument through a pry opening and pries the second drive coupling end fitting from the motor shaft.

20 Claims, 5 Drawing Sheets

OIL BURNER DRIVE COUPLING REMOVAL TOOL

FIELD OF THE INVENTION

The present invention relates generally to oil burner units, and more particularly to an apparatus and method used in maintenance of the oil burner units to remove drive couplings or drive coupling components.

BACKGROUND OF THE INVENTION

The operation and maintenance of oil burner units are well known. An oil burner unit typically includes a motor and an oil pump which are mounted directly opposite each other on the exterior of the oil burner unit housing. A drive coupling couples the motor shaft and the oil pump shaft so that the motor shaft drives the oil pump shaft. The motor shaft includes a flat portion ("flat") which rotates the drive coupling.

The drive coupling, which is usually made of a plastic, is comprised of a first coupling end fitting that is disposed on the oil pump shaft, a second coupling end fitting that is disposed on the motor shaft, and a connector which connects the first and second coupling end fittings.

During maintenance of the oil burner unit, it is often necessary to remove the oil pump from the oil burner unit. When the technician pulls the oil pump from the oil burner unit, the drive coupling often splits into its components with the second drive coupling end fitting remaining disposed on the motor shaft. This happens because over a period of time the plastic of the second drive coupling end fitting bonds to the metal of the motor shaft and the plastic of the first drive coupling end fitting bonds to the metal of the pump shaft. In order to reinstall the drive coupling, or replace if broken, it is necessary to remove the second drive coupling end fitting from the motor shaft.

The pump opening in the oil burner unit housing is too small to allow a technician to insert his hand or a pliers to remove the second drive coupling end fitting from the motor shaft. The common practice is to pry the second drive coupling end fitting from the motor shaft by placing a screwdriver between oil burner fan blades and prying the second drive coupling end fitting from the motor shaft. This is often a hit and miss process and there is always a risk of damaging the fan blades. Further, even if the technician removes the second drive coupling end fitting from the motor shaft by this method, the fitting invariably falls inside the housing where it is difficult to reach.

In some oil burner units, there is no access for a screwdriver to the second drive coupling end fitting between the fan blades, either because the fan blades are located so close to each other or because burner design does not allow access to the second drive coupling end fitting. In these cases, the technician must remove the motor from the oil burner unit to remove the second drive coupling end fitting, which is time consuming and laborious. If the work is performed on a mobile home furnace, the technician must remove the whole oil burner unit from the furnace to have enough room to remove the motor, wherein such removal includes disassembly. The oil burner unit disassembly tends to destroy certain burner parts and is further time consuming.

SUMMARY OF THE INVENTION

It is therefore an object of the present invention to improve the art of oil burners.

It is another object of the present invention to provide a tool which minimizes the amount of time a technician must spend to maintain an oil burner unit.

It is a further object of the present invention to provide a tool which minimizes a a technician's effort when attempting to remove a drive coupling or a drive coupling component in an oil burner unit.

It is still another object of the present invention to provide a tool which is simple to produce, yet effective for removing a drive coupling or a drive coupling component in an oil burner unit.

It is yet still another object of the present invention to provide a tool which is uniquely suited for removing a drive coupling or a drive coupling component in an oil burner unit.

It is still a further object of the present invention to provide a lightweight and easy to handle tool which is effective for removing a drive coupling or a drive coupling component in an oil burner unit.

It is even another object to provide an apparatus which makes it easier for a technician to remove a drive coupling or a drive coupling component from a motor shaft through an oil pump opening of an oil burner housing.

These and other objects are obtained in accordance with the present invention wherein there is provided an apparatus for removing at least one drive coupling component from an oil burner unit. The drive coupling comprises a first drive coupling end fitting disposed on an oil pump shaft, a second drive coupling end fitting disposed on a motor shaft and a drive coupling connector which connects the first and second drive coupling end fittings. The apparatus comprises a handle having a proximal and a distal end, a front wall contiguous with the distal end of the handle and including a proximal exterior surface and a distal interior surface, a receiver contiguous with the interior surface of the front wall for receiving at least one drive coupling component, the receiver having an interior surface and a longitudinal axis, and an engagement member contiguous with the distal end of the receiver, the engagement member having a longitudinal axis perpendicular to the longitudinal axis of the receiver, the engagement member including an interior surface for engaging a distal end of the second drive coupling end fitting.

The apparatus of the present invention preferably includes at least one pry receptor disposed on the handle for receiving a prying instrument, wherein the at least one pry receptor includes at least one opening disposed through said handle.

The apparatus of the present invention also preferably includes a lip disposed on the proximal end of the handle and a downwardly disposed beveled portion at the distal end of the handle, such that the bottom of the distal end of the handle is integral with the bottom of the exterior surface of the front wall.

It is also preferable that the interior surface of the receiver includes an arch shaped portion and the interior surface of the receiver includes a geometry which is substantially the same size and shape as a portion of the exterior surface of the second drive coupling end fitting.

Alternatively, the interior surface of the receiver can include a geometry which is substantially the same size and shape as a portion of the exterior surface of the drive coupling.

It is also preferable that the apparatus of the present invention be solid cast.

A method for removing at least one drive coupling component from an oil burner unit is also contemplated by the present invention. The drive coupling comprises a first drive coupling end fitting disposed on an oil pump shaft of an oil pump, a second drive coupling end fitting disposed on a motor shaft and a drive coupling connector which connects the first and second drive coupling end fittings. The method comprises removing the oil pump, placing an apparatus through the oil pump opening and underneath the at least one drive coupling component, wherein the apparatus comprises:

a handle having a proximal and a distal end, the handle including at least one pry receptor for receiving a prying instrument;

a front wall contiguous with the distal end of the handle and including a proximal exterior surface and a distal interior surface;

a receiver contiguous with the interior surface of the front wall for receiving at least one drive coupling component, the receiver having an interior surface and a longitudinal axis; and an engagement member contiguous with the distal end of the receiver, said engagement member having a longitudinal axis perpendicular to the longitudinal axis of the receiver, the engagement member including an interior surface for engaging a distal end of the second drive coupling end fitting; and inserting the pry instrument in said pry receptor, and prying said at least one drive coupling component from said motor shaft.

BRIEF DESCRIPTION OF THE DRAWINGS

The above and other objects of the present invention will be better understood by reading the following detailed description of the preferred embodiments of the invention, when considered in connection with the accompanying drawings, in which.

DETAILED DESCRIPTION OF THE PREFERRED EMBODIMENT

Figure 1:
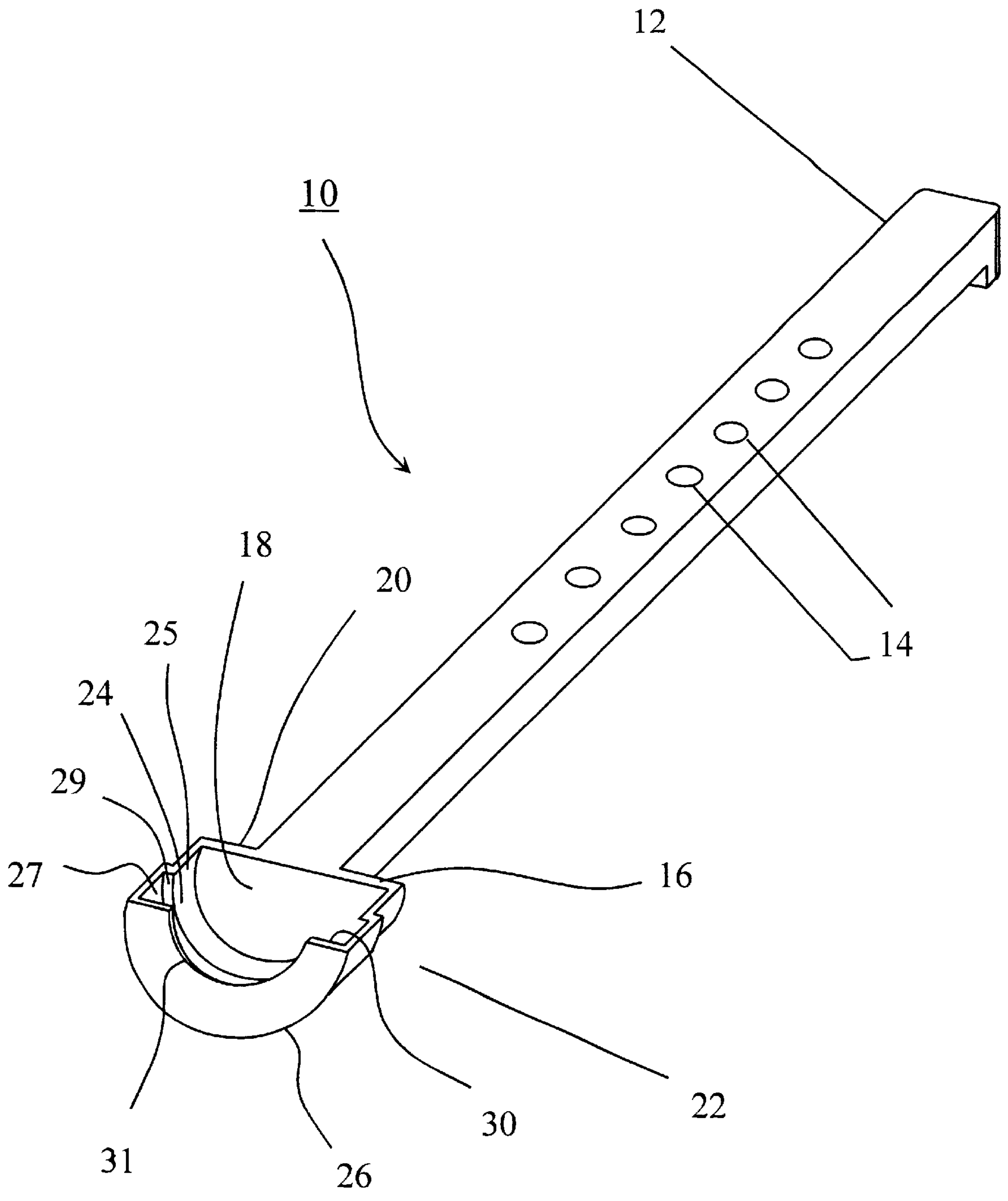
FIG. 1 shows a perspective top view of a preferred embodiment of the drive coupling removal tool of the present invention.
Figure 3:
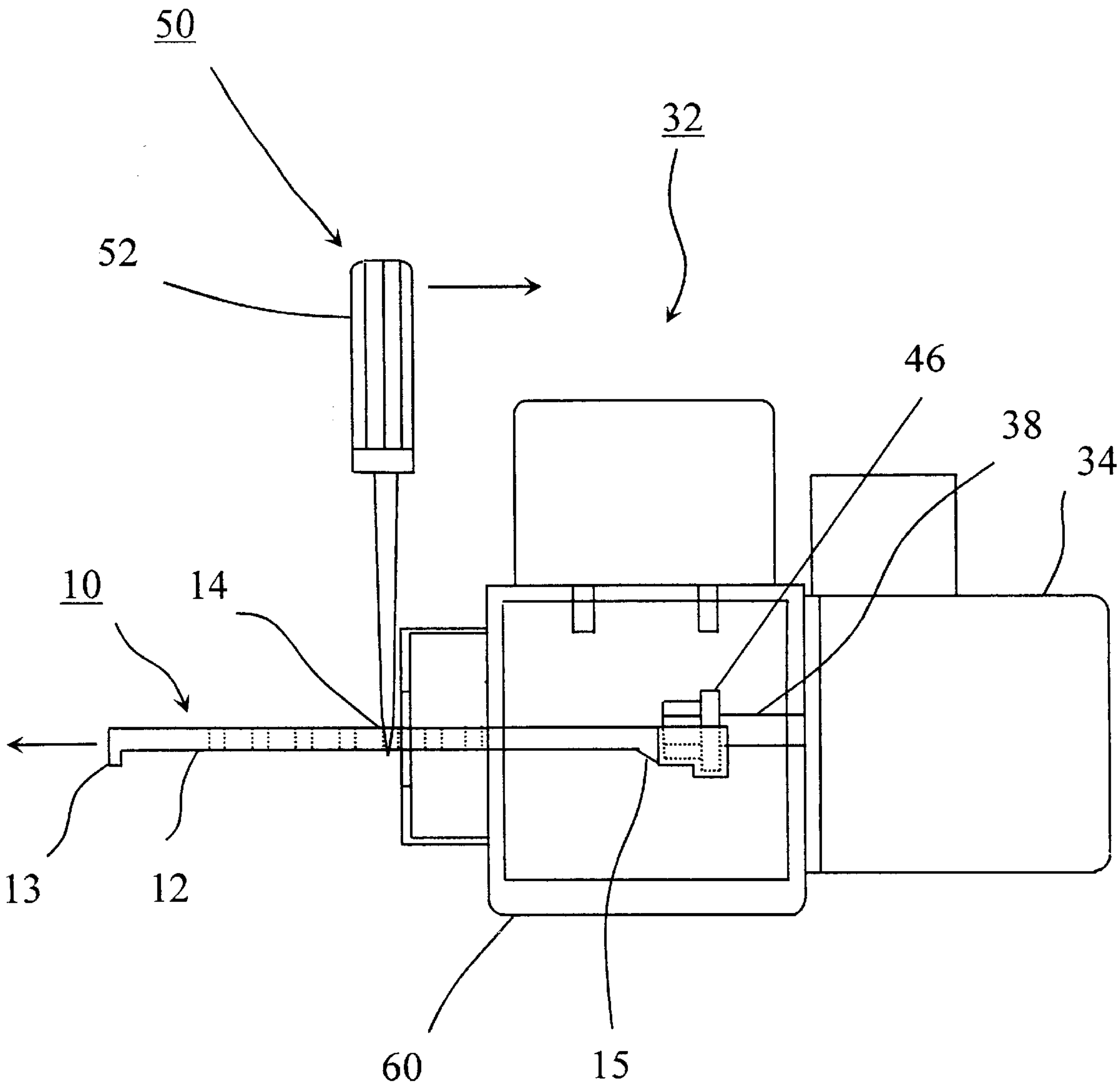
FIG. 3 shows the drive coupling removal tool of FIG. 1 in use in the oil burner unit of FIG. 2.

Referring to FIGS. 1 and 3, a drive coupling removal tool 10 according to the present invention is indicated generally. Drive coupling removing tool 10 is a one piece device which is solid cast from a plastic. It will be apparent from reading the entire detailed description that the drive coupling removal tool 10 can be made of other materials, such as metal. A handle 12 extends to a front wall 16 and includes a beveled portion 15 which preferably allows the handle 12 to approximately meet the top and bottom of the front wall 16, thereby providing additional strength when used in accordance with the present invention. At least one opening 14 is disposed along the handle length which allows for the insertion of a prying instrument, as will be discussed herein below. It is preferable that several openings 14 be disposed along the handle 12 because different oil burner units have various housing sizes. Consequently, the insertion distance of the drive coupling removal tool 10 into the oil burner unit directly depends on which type of oil burner unit is in use. Referring still to FIG. 3, the handle 12 includes a downwardly disposed lip 13 that provides a technician added gripping area when using the drive coupling removal tool 10.

Although the handle 12 is being described in a preferred embodiment, it should be apparent to one skilled in the art that other embodiments will operate sufficiently. For example, the openings 14, which are actually pry receptors, could easily be replaced by other pry receptors such as latitudinally disposed extensions (not shown). Also, it is not completely necessary that the handle 12 approximately meet the top and bottom of the front wall 16. Further, the downwardly disposed lip 13 is a convenience feature and could be replaced by a different type of lip or could be entirely non-existent.

The front wall 16 includes an exterior surface 20 and an interior surface 18. The interior surface 18 extends substantially perpendicular to the longitudinal axis of the handle 12. Extending perpendicular from the interior surface 18 of the front wall 16 is a receiver 22.

Figure 5:
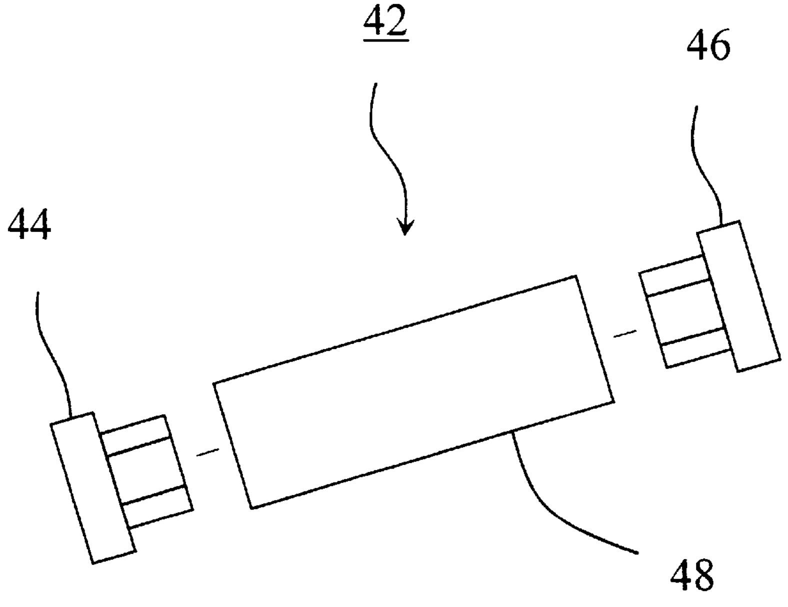
FIG. 5 shows an exploded view of a drive coupling.

The receiver 22 includes an interior surface 24 which provides a plurality of functions. First, and most importantly, the interior surface 24 of the receiver 22 provides a sufficient surface area to hold at least one component of a drive coupling 42, shown in FIGS. 2 and 5. The drive coupling 42, whose operation will be described herein below includes a first drive coupling end fitting 44, a second drive coupling end fitting 46 and a connector 48. The interior surface 24 of the receiver 22, in the preferred embodiment is substantially sized and shaped to the exterior surface of the second drive coupling end fitting 46.

Figure 4:
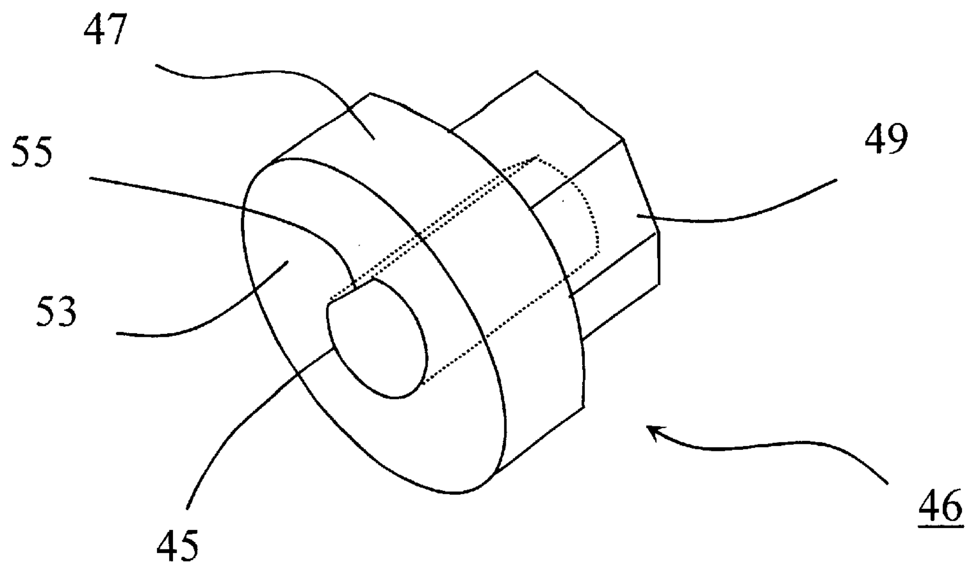
FIG. 4 shows a perspective view of a second drive coupling end fitting.

Referring to FIG. 1, the interior surface 24 includes a first arcuate portion 25 and a second arcuate portion 27 which are separated by a shoulder 29. Referring to FIG. 4, the second drive coupling end fitting 46 includes a head 47 having an opening 45 extending partially therethrough. The opening 45 is sized and shaped to fit over the end of a motor shaft 38 so that the drive coupling 42 rotates with the motor shaft 38. The motor shaft 38 actually includes a flat surface (not shown) which rotates a flat surface 55 of the second drive coupling end fitting 46. Extending from the head 47 of the second drive coupling end fitting 46 is a core 49. In accordance with a preferred use of the present invention, the first arcuate portion 25 engages the outer surface of the core 49 and the second arcuate portion 27 engages the outer surface of the head 47, thereby keeping the second drive coupling end fitting 46 axially aligned with the motor shaft 38 as the drive coupling removal tool 10 is used to remove the second drive coupling end fitting 46 from the motor shaft 38.

Referring back to FIG. 1, an engagement member 26 having an interior surface 30 is disposed on the distal end of the receiver 22 so that the longitudinal axis of the interior surface 30 of the engagement member 26 is perpendicular to the longitudinal axis of the interior surface 24 of the receiver 22. A notched C-shaped notch 31 allows the engagement member 26 to conform to the shape of the motor shaft 38, thereby providing the interior surface 30 of the engagement member 26 a sufficient surface area in which to engage a distal end 53 of the second drive coupling end fitting 46.

Figure 2:
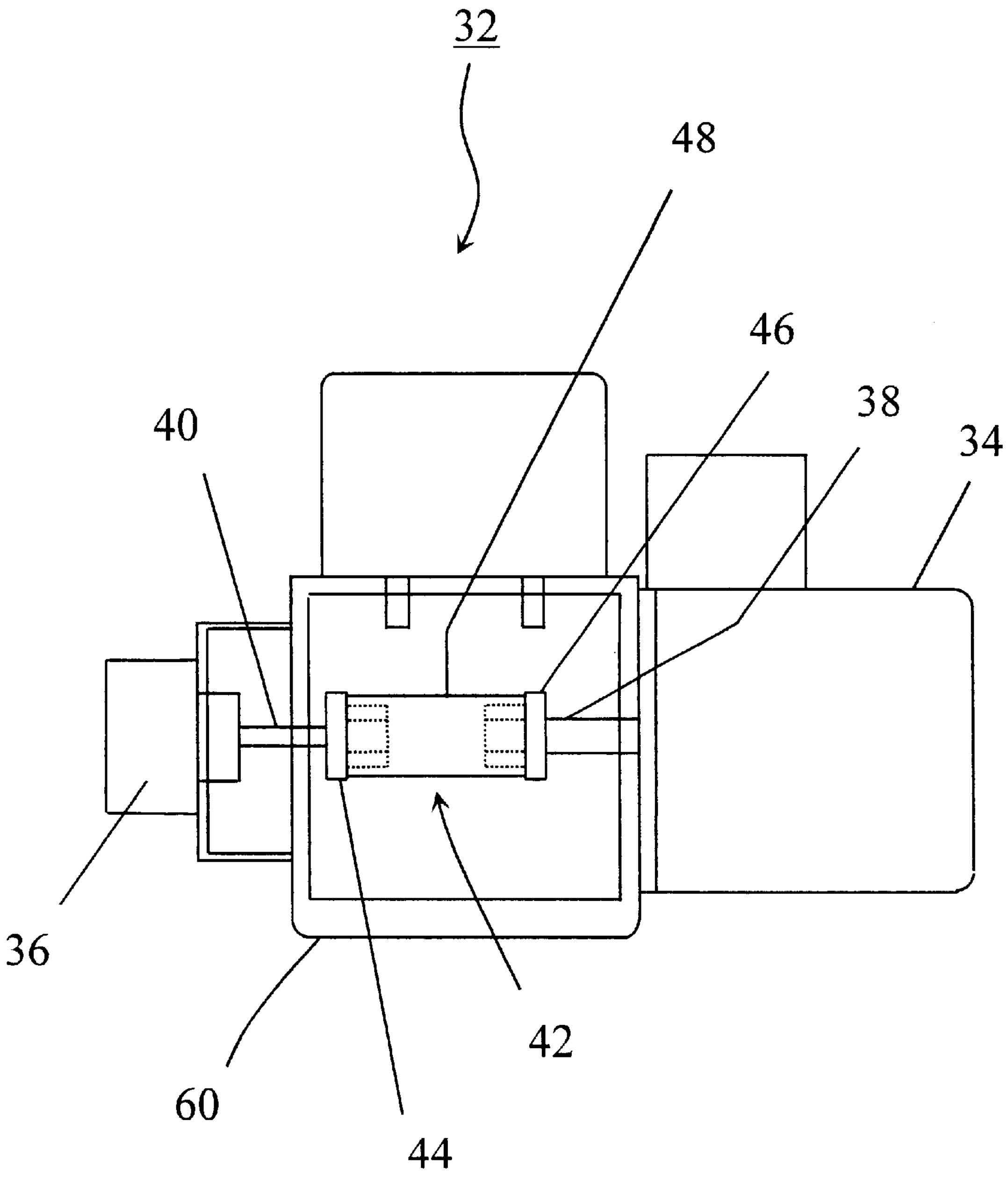
FIG. 2 shows a cross-sectional rear view of an oil burner unit.

FIG. 2 shows a cross-sectional view of an oil burner unit 32 minus various components, which are unnecessary for the understanding of the present invention. A motor 34 drives an oil pump 36 by means of coupling their shafts together. The second drive coupling end fitting 46 is disposed on the motor shaft 38 so that they rotate together by their flats. The connector 48 connects the first drive coupling end fitting 44 so that the first and second drive coupling end fittings 44 and 46 rotate together, shown in FIG. 5. The first drive coupling end fitting 44 is disposed on a shaft 40 of the oil pump 36 and, therefore, the oil pump shaft 40 rotates with the motor shaft 38.

Figure 6:
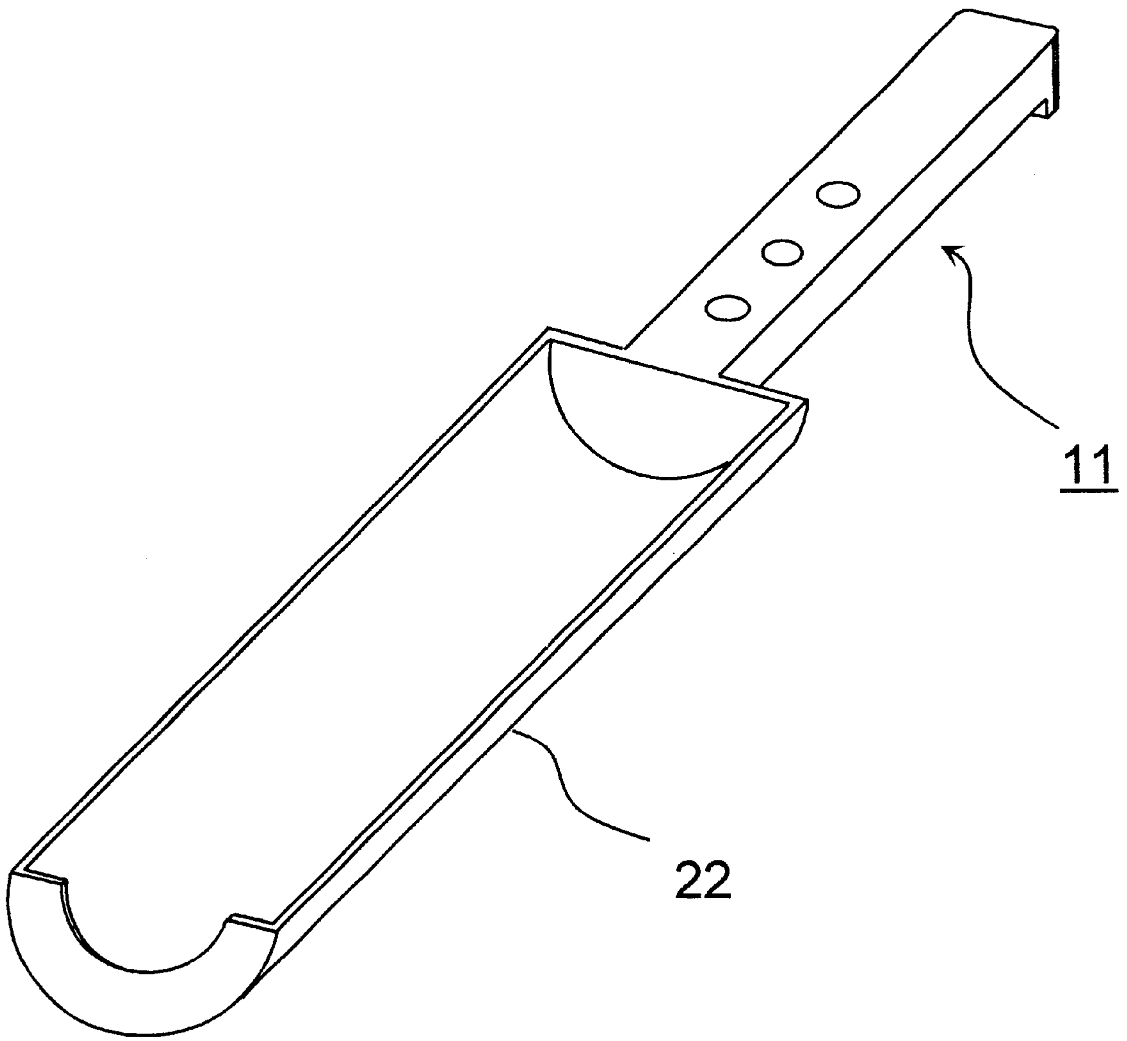
FIG. 6 shows a second preferred embodiment of the drive coupling removal tool of the present invention.

FIG. 3 shows the drive coupling removal tool 10 of the present invention in use in the oil burner unit 32. First, the technician removes the oil pump 36, FIG. 2, so that only the second drive coupling end fitting 46 remains on the motor shaft 38. However, it should be apparent that the entire drive coupling 42 could remain inside the oil burner unit 32 after the oil pump 36 is removed. Next, the technician inserts the drive coupling removal tool 10 through the oil pump opening into the oil burner unit 32 so that the receiver 22 lies under the second drive coupling end fitting 46 and the interior surface 30 of the engagement member 26 engages the distal end 53 of the second drive coupling end fitting 46. It should be apparent to one skilled in the art that the receiver 22 may take other shapes and sizes. For example, the receiver 22 can be sized and shaped, shown in FIG. 6, to receive the entire drive coupling 42.

To remove the second drive coupling end fitting 46, shown in FIG. 3, the technician inserts a prying instrument such as screwdriver 50 into an opening 14 on the handle 12 of the drive coupling removal tool 10. With one hand the technician grasps the handle 12 and with the other hand torques the handle 52 of the screwdriver about the oil burner unit housing 60. As earlier noted, the receiver 22 keeps the second drive coupling fitting end 46 axially aligned with the motor shaft 38. As the second drive coupling end fitting 46 is pried from the motor shaft, the second drive coupling end fitting 46 is supported by the receiver 22 so that the technician simply removes the second drive coupling end fitting 46 from the oil burner unit housing 60. Also previously mentioned, the lip 13 of the handle 12 provides additional gripping surface for the technician.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What we claim is:

1. An apparatus for removing at least one drive coupling component from an oil burner unit, wherein a drive coupling comprises a first drive coupling end fitting disposed on an oil pump shaft of an oil pump, a second drive coupling end fitting disposed on a motor shaft and a drive coupling connector which connects the first and second drive coupling end fittings, said apparatus comprising:

a handle having a proximal and a distal end, wherein said handle includes at least one pry receptor for receiving a prying instrument;

a front wall contiguous with the distal end of said handle and including a proximal exterior surface and a distal interior surface;

a receiver having a distal and a proximate end, said proximate end of said receiver contiguous with the interior surface of said front wall for receiving at least one drive coupling component, said receiver having an interior surface and a longitudinal axis; and an engagement member contiguous with the distal end of said receiver, said engagement member including an interior surface configured for engaging a distal end of the second drive coupling end fitting.

2. The apparatus of claim 1, wherein said at least one pry receptor includes at least one opening disposed through said handle.

3. The apparatus of claim 1, wherein said handle includes a lip disposed on the proximal end of said handle.

4. The apparatus of claim 1, wherein said distal end of said handle includes a downwardly disposed beveled portion, such that the bottom of the distal end of said handle is integral with the bottom of the exterior surface of said front wall.

5. The apparatus of claim 1, wherein the interior surface of said receiver includes at least one arch shaped planar surface.

6. The apparatus of claim 1, wherein the interior surface of said receiver includes a geometry which is substantially the same size and shape as a portion of the exterior surface of said second drive coupling end fitting.

7. The apparatus of claim 1, wherein said apparatus is solid cast from a material selected from a group consisting essentially of a plastic and a metal.

8. The apparatus of claim 1, wherein said engagement member includes a C-shaped notch.

9. An apparatus for removing at least one drive coupling component from an oil burner unit, wherein a drive coupling comprises a first drive coupling end fitting disposed on an oil pump shaft, a second drive coupling end fitting disposed on a motor shaft and a drive coupling connector which connects the first and second drive coupling ends fittings, said apparatus used in combination with a prying instrument, said apparatus comprising:

a handle having a proximal and a distal end, said handle including at least one pry receptor for receiving said prying instrument;

a front wall contiguous with the distal end of said handle and including a proximal exterior surface and a distal interior surface;

a receiver having a distal and a proximate end, said proximate end of said receiver contiguous with the interior surface of said front wall for receiving at least one drive coupling component, said receiver having an interior surface and a longitudinal axis; and an engagement member contiguous with the distal end of said receiver, said engagement member including an interior surface configured for engaging a distal end of the second drive coupling end fitting.

10. The apparatus of claim 9, wherein said at least one pry receptor includes at least one opening disposed through said handle.

11. The apparatus of claim 9, wherein said handle includes a lip disposed on the proximal end of said handle.

12. The apparatus of claim 9, wherein said distal end of said handle includes a downwardly disposed beveled portion, such that the bottom of the distal end of said handle is integral with the bottom of the exterior surface of said front wall.

13. The apparatus of claim 9, wherein the interior surface of said receiver includes at least one arch shaped planar surface.

14. The apparatus of claim 9, wherein the interior surface of said receiver includes a geometry which is substantially the same size and shape as a portion of the exterior surface of said second drive coupling end fitting.

15. The apparatus of claim 9, wherein the interior surface of said receiver includes a geometry which is substantially the same size and shape as a portion of the exterior surface of said drive coupling.

16. The apparatus of claim 9, wherein said apparatus is solid cast from a material selected from a group consisting essentially of a plastic and a metal.

17. The apparatus of claim 9 wherein said handle includes a lip disposed on the proximal end of said handle, wherein the distal end of said handle includes a downwardly disposed beveled portion, such that the bottom of the distal end of said handle is integral with the bottom of the exterior surface of said front wall, and wherein the interior surface of said receiver includes a geometry which is substantially the same size and shape as a portion of the exterior surface of said second drive coupling.

18. The apparatus of claim 9,wherein the interior surface of said front wall, the interior surface of said receiver, and the interior surface of said engagement member form a volume which supports at least one drive coupling component.

19. The apparatus of claim 9, wherein said engagement member includes a C-shaped notch.

20. A method for removing at least one drive coupling component from an oil burner unit, wherein a drive coupling comprises a first drive coupling end fitting disposed on an oil pump shaft of an oil pump, a second drive coupling end fitting disposed on a motor shaft and a drive coupling connector which connects the first and second drive coupling end fittings, said method comprising:

removing said oil pump, thereby providing an oil pump opening in said oil burner unit;

placing an apparatus through said oil pump opening so that a portion of the said apparatus lodges underneath said at least one drive coupling component, said apparatus comprising, a handle having a proximal and a distal end, said handle including at least one pry receptor for receiving a prying instrument, a front wall contiguous with the distal end of said handle and including a proximal exterior surface and a distal interior surface, a receiver having a distal and a proximate end, said proximate end of said receiver contiguous with the interior surface of said front wall for receiving at least one drive coupling component, said receiver having an interior surface and a longitudinal axis, and an engagement member contiguous with the distal end of said receiver, said engagement member including an interior surface configured for engaging a distal end of the second drive coupling end fitting;

inserting said pry instrument in said pry receptor; and prying said at least one drive coupling component from said motor shaft.

* * * * *